United States Patent
Sanders et al.

(10) Patent No.: US 6,235,381 B1
(45) Date of Patent: May 22, 2001

(54) REINFORCED CERAMIC STRUCTURES

(75) Inventors: Daniel G. Sanders, Sumner, WA (US); Bryan L. Cox, El Chajon, CA (US)

(73) Assignee: The Boeing Company

( * ) Notice: Subject to any disclaimer, the term of this patent is extended or adjusted under 35 U.S.C. 154(b) by 0 days.

(21) Appl. No.: 09/212,560

(22) Filed: Dec. 16, 1998

Related U.S. Application Data

(60) Provisional application No. 60/071,765, filed on Dec. 30, 1997.

(51) Int. Cl.$^7$ .................................................. B32B 18/00
(52) U.S. Cl. .......................... 428/325; 428/328; 428/332; 428/364; 428/401; 428/405; 156/89; 156/296
(58) Field of Search .................. 264/DIG. 11; 72/60, 72/57, 709; 428/325, 328, 332, 364, 401, 404, 405; 156/89, 276, 296

(56) References Cited

U.S. PATENT DOCUMENTS

| | | |
|---|---|---|
| 4,252,588 | 2/1981 | Kratsch et al. . |
| 4,769,346 * | 9/1988 | Gadkaree et al. . |

FOREIGN PATENT DOCUMENTS

| | | |
|---|---|---|
| 758917 | 10/1956 | (GB) . |

* cited by examiner

Primary Examiner—Merrick Dixon
(74) Attorney, Agent, or Firm—J. Michael Neary

(57) ABSTRACT

A reinforced ceramic structure, such as a superplastic forming die for forming a metal part, has a body of cast silica/calcium aluminate or mullite based ceramic material; and a plurality of reinforcing rods, made of monolithic fused oxides of silicon or aluminum, cast into said ceramic body. The rods have a thickness between ⅛"–2.0" and are spaced apart on centers by about 2–10 times the diameter of the rods. The rods are bonded in the ceramic body or they may be coated with a release agent to prevent bonding to said ceramic body so that they can translate in the direction of their axes to prevent cracking during drying and curing. The rods are disposed in an array of at least two rows, with the rods in each row arranged parallel to each other and with the rods in adjacent rows arranged orthogonally to each other. The rows are spaced apart a distance equal to about ½–3 times the diameter of the rods. Some of said rods may be hollow and receive electrical heater elements for heating the reinforced ceramic structure. The rods extend completely across the full length and width of the body. A process for manufacturing the reinforced ceramic die includes selecting a casting box having internal dimensions equal to desired external dimensions of the ceramic die and having a floor and an open top. A model of the metal part is attached to the floor of the casting box. Pairs of aligned holes are bored in inside surfaces of the casting box, and a reinforcing rod is mounted in each of the pairs of holes. The rods are made of monolithic fused oxides of silicon or aluminum. The casting box is filled with a pourable cementitious material to the open top, and the pourable cementitious material is allowed to set and cure into a green die in the casting box. The green die is removed from the casting box and is inverted for removal of the model. The green die is dried and fired to produce a refractory ceramic die.

19 Claims, 4 Drawing Sheets

REINFORCED CERAMIC STRUCTURES

This application claims benefit of provisional application Ser. No. 60/071,765, filed Dec. 30, 1997.

This invention pertains to reinforcement of ceramic structures subject to thermal and/or mechanical stress, and to a method of manufacturing a reinforced ceramic structure with reinforcing elements that are chemically and thermally compatible with the ceramic material. More particularly, this invention pertains to reinforcement of ceramic dies used for forging or for superplastic forming and diffusion bonding of aluminum and titanium alloys and other materials that can be formed at elevated temperature.

BACKGROUND OF THE INVENTION

Castable ceramic materials made of fused silica-aggregate and calcium aluminate cement are widely used in many high temperature (1000° F.–1700° F.) environments because of their low cost and their properties of compression strength, hardness, heat resistance, dimensional stability and rapid castability to net shape. However, their use has been limited because of their low modulus of rupture and brittleness, which historically has lead to failures due to cracking. Other stronger castable ceramics, such as mullite based materials are being developed, but these materials are also relatively weak and brittle and have their own drawbacks, such as excessive shrinkage during drying and curing. All of these materials would be more useful if a way were found to increase their load bearing capacity.

One valuable application for ceramic materials has been in forming dies for superplastic forming, primarily of titanium and aluminum alloys, but also some corrosion resistant steel alloys, nickel alloys and superalloys. The desirable properties of low cost, rapid production and excellent high temperature stability make possible the fast, accurate and low cost production of dies using castable ceramic materials. U.S. Pat. No. 5,467,626 issued on Jun. 4, 1996 to D. G. Sanders teaches an innovative freestanding ceramic die made with these materials. The disclosure of this patent is incorporated herein by reference.

However, the durability of ceramic dies is poor. It is uncommon for a die for a part of average draw depth to produce 20 parts before it fails and must be replaced, so ceramic dies are used primarily for rapid prototyping and limited production quantities of parts. Durability can be increased by increasing the thickness of the die, but excessive thickness increases the mass of the die and increases the handling difficulty. More importantly, thick walled dies are difficult to manufacture because they tend to crack during the initial drying stage, which is a process in which heat is released in an exothermic reaction, causing extreme thermal stress on the die. Also, during curing and firing, shrinkage and trapped moisture can cause cracking of a die that has survived the drying process. During part production, the heat-up time for raising the temperature of a massive superplastic forming die to 1650° F., a typical superplastic forming temperature for titanium, is significantly longer than it is for a standard "thin" walled die. Accordingly, there has been a continuous effort by many workers in the art to improve the modulus of rupture of ceramic superplastic forming dies.

The attempts that have been made to solve the tensile weakness and brittleness problem with ceramics have been primarily of two types: 1) providing external compressive support to the structure and 2) mixing fibers of a reinforcing material into the castable materials and allowing the ceramic to cure with the fibers in place.

External compressive support is a common stratagem and in fact was first used in the form of a steel containment box as a safety precaution because of the fear of explosive bursting of the ceramic die under high forming gas pressure and high compressive loading by the press on the lid to seal the pressurized forming gas in the die cavity. Steel containment boxes continue to be used despite the proven safety of freestanding ceramic dies. One illustration of such a containment vessel is seen in U.S. Pat. No. 4,584,860 issue to Kirke Leonard.

Although steel or CRES enclosed ceramic dies work well and have adequate strength, they are substantially more costly to produce and the removal of the ceramic material from the containment box after the useful life of the die has ended is difficult and laborious. Parts made using the steel box enclosed ceramic dies are historically more expensive since a larger blank from which the part is made is needed to attain a seal around the forming chamber periphery, resulting in large amounts of scrap/waste that must be trimmed off of the formed part. Other more innovative forms of compressive external support of the die have been tried successfully. One such technique is shown in U.S. Pat. No. 5,683,608 to Marc Matsen et al. entitled "Ceramic Die for Induction Heating Work Cells". This technique uses fiberglass rods cast into the ceramic die and used as tie rods to hold external phenolic blocks in compression against the four sides of the die. This scheme works well but its use is restricted by the temperature limitations of the reinforcing materials.

The use of reinforcing fibers mixed into the castable ceramic material when it is mixed up for casting is a concept that has been explored by numerous ceramic investigators. The material of which the reinforcing fibers is made has high tensile strength and the theory behind this approach is that the tensile load would transfer to and be borne by the fibers, thereby improving the modulus of rupture and tensile strength. Experience with reinforcing fibers in ceramics is encouraging: although there has not been a significant increase in the modulus of rupture, there has been some improvement in toughness. Some questions remain whether the fibers bond sufficiently with the cement, or whether the amount of strain required in the ceramic material before tensile stress can be transferred to and borne by the fibers exceeds the strain capability of the brittle ceramic material. The large difference in coefficient of thermal expansion between the CRES fiber and the ceramic material can produce internal stresses within the die that can be deleterious to its survival in a hot, high stress application.

SUMMARY OF THE INVENTION

Accordingly, this invention provides an improved reinforced ceramic structure having a modulus of rupture that is substantially greater than that provided by the same structure design without the inventive reinforcing. The invention also provides an improved method of reinforcing ceramic structures that is relatively inexpensive, easy to use in a production environment and repeatably produces a substantial improvement in the load bearing capacity of the ceramic structure.

These benefits of the invention are attained in a reinforced ceramic structure such as a superplastic forming die or a forging die having a body of cast ceramic material in which are embedded an array of ceramic rods of a high temperature resistant material such as quartz or alumina having a flexural strength at least five times greater than the ceramic material, and a coefficient of thermal expansion substantially equal to the coefficient of thermal expansion of the cast ceramic material. The rods are preferably solid and cylindrical, about ¾" in diameter and extend through the full length and width of the cast ceramic body in an orthogonal grid positioned in the body in the region where failure initiates in the absence of the reinforcing rods.

DESCRIPTION OF THE DRAWINGS

The invention and its many attendant objects and advantages will become clearer upon reading the following description of the preferred embodiment in conjunction with the following drawings, wherein.

DESCRIPTION OF THE PREFERRED EMBODIMENT

The invention will be described first as embodied in a ceramic die for superplastic forming and diffusion bonding of metal parts, primarily titanium alloys and aluminum alloys. Nickel based alloys and stainless steel can also be superplastically formed in ceramic dies. Free standing ceramic dies for this purpose are described in U.S. Patent No. 5,467,626, the disclosure of which is incorporated herein by reference. Use of the reinforcing process disclosed herein improves the load bearing capacity of these dies, slows the crack initiation and propagation process, and increases the number of parts that can be made on them before they fail. However, this invention is not limited to use in ceramic dies. We contemplate its use in ceramic structures that would be subjected to high loads at high temperatures in use, including other types of dies such as hot sizing dies, creep forming dies, foundry dies and forging dies, and also untraditional uses of ceramics such as engine blocks, casting molds for molten metal or composite consolidation dies used in autoclaves, as well as load bearing ceramic structures that are fired in production. A forging die made in accordance with this invention will be described below.

Figure 1:
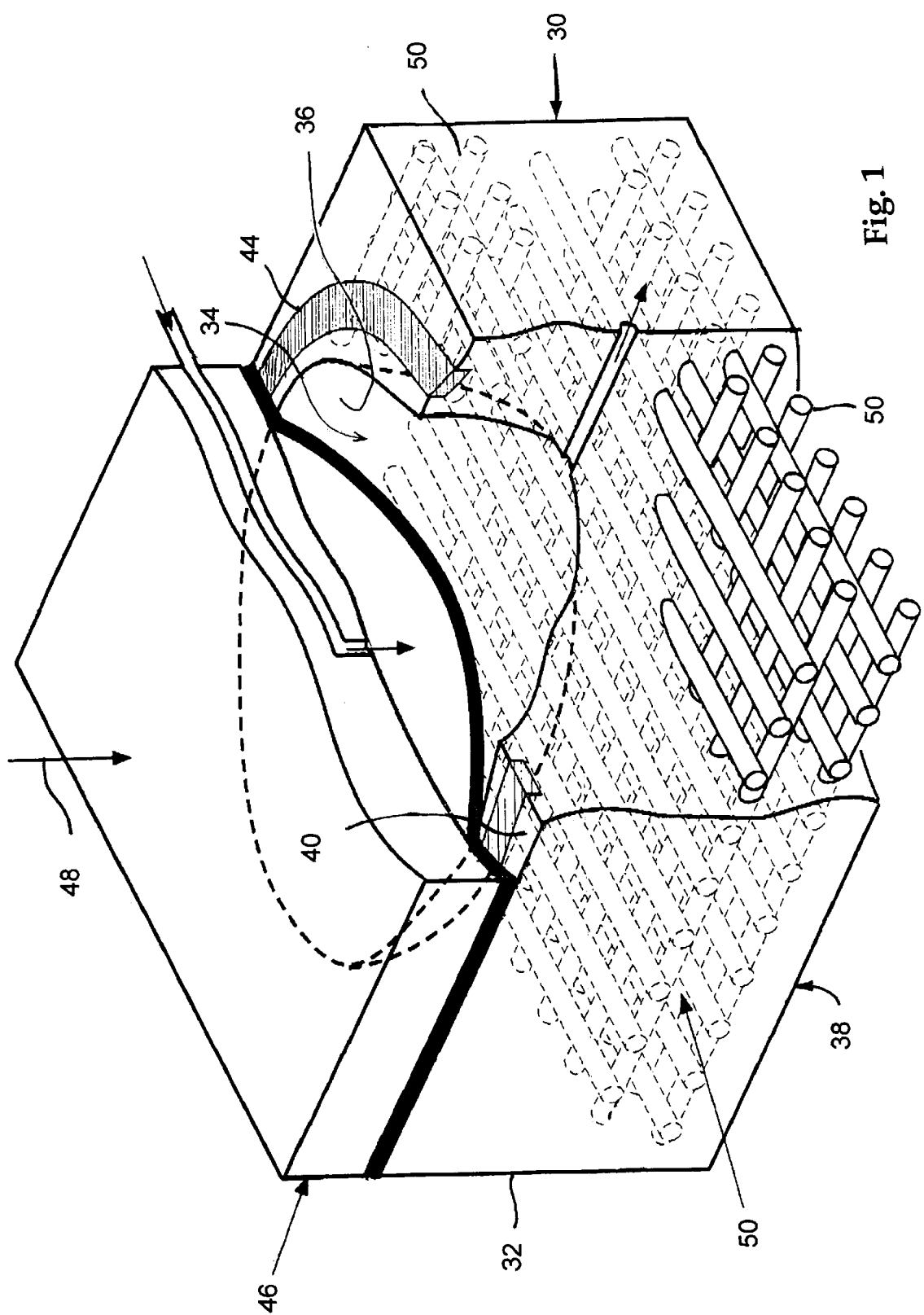
FIG. 1 is a perspective view, partly in section, of a reinforced ceramic superplastic forming die made in accordance with this invention.

Turning now to the drawings, wherein like reference numerals designate identical or corresponding parts, and more particularly to FIG. 1 thereof, a ceramic die 30 is shown having a die base 32 including a die cavity 34 with the part shape defined by internal surfaces 36 of the die cavity 34. A peripheral lip 40 at the top of the wall has sealing structure such as a bead or a groove which could receive a heat resistant gasket such as a stainless steel ring 44 by which the die cavity 34 can be sealed by a lid 46 held in place on the peripheral lip by strong compressive force (represented by arrow 48) exerted by hydraulic hot forming or a superplastic forming press (not shown) of known design and available commercially from sources such as L&F Press Company, Inc. in Huntington Park, Calif.

Operation of superplastic forming dies per se is known, so their operation will not be described in detail. For a detailed description of the use of ceramic dies in superplastic forming and diffusion bonding, reference can be made to the aforesaid U.S. Pat. No. 5,467,626. Control of the forming gas in a superplastic forming press can be by the apparatus and method described in U.S. Pat. No. 5,419,170 entitled "Gas Control for Superplastic Forming" issued on May 30, 1995 to Sanders et al.

The reinforced ceramic superelastic forming die shown in FIG. 1 has a plurality of quartz rods 50 disposed in an array in the floor 38 of the die base 32. The rods 50 are ¾" in diameter and are spaced apart in two or more rows disposed orthogonally to each other and parallel to the plane of the under surface of the die floor 38. The rods 50 in each row are spaced apart a distance equal to about 1–5 times the rod diameter and the rows are spaced apart a distance equal to about ½–3 times the rod diameter. The rods 50 are available from several suppliers, including G. E and McMaster-Carr and are used as received from the manufacturer. The quartz rods bond strongly to the calcium aluminate cement without the need for texturing or profiling the rods. However, the rods may textured, as by grit blasting, and/or profiled by machining to produce surface profiles to improve the bonding strength and securely lock the rods longitudinally in the ceramic die base 32. However, quartz is a notch sensitive material, so it may be preferable to avoid sharp corners in profiled designs to increase rod resistance to cracking or failure. Alternatively, there may be a benefit to preventing the rods 50 from bonding to the ceramic material in the die base 32. For example, if the shrinkage rate of the particular ceramic material used for the die or other structure during the drying or firing steps is more than about 1%, there may be a benefit to allow relative movement between the ceramic material and the rods 50 during shrinkage. In this case, the rods can be waxed or otherwise treated with a parting agent to prevent bonding between the rods and the ceramic material.

When the rods are bonded and/or locked in the ceramic die base 32 by profiling the rods, they contribute stiffness and also tensile strength to the ceramic body. When the rods are unbonded and unlocked in the ceramic body 32, that is, they can move longitudinally relative to the ceramic body 32, they contribute only stiffness. However, the stiffness contribution alone is substantial.

Figure 2:
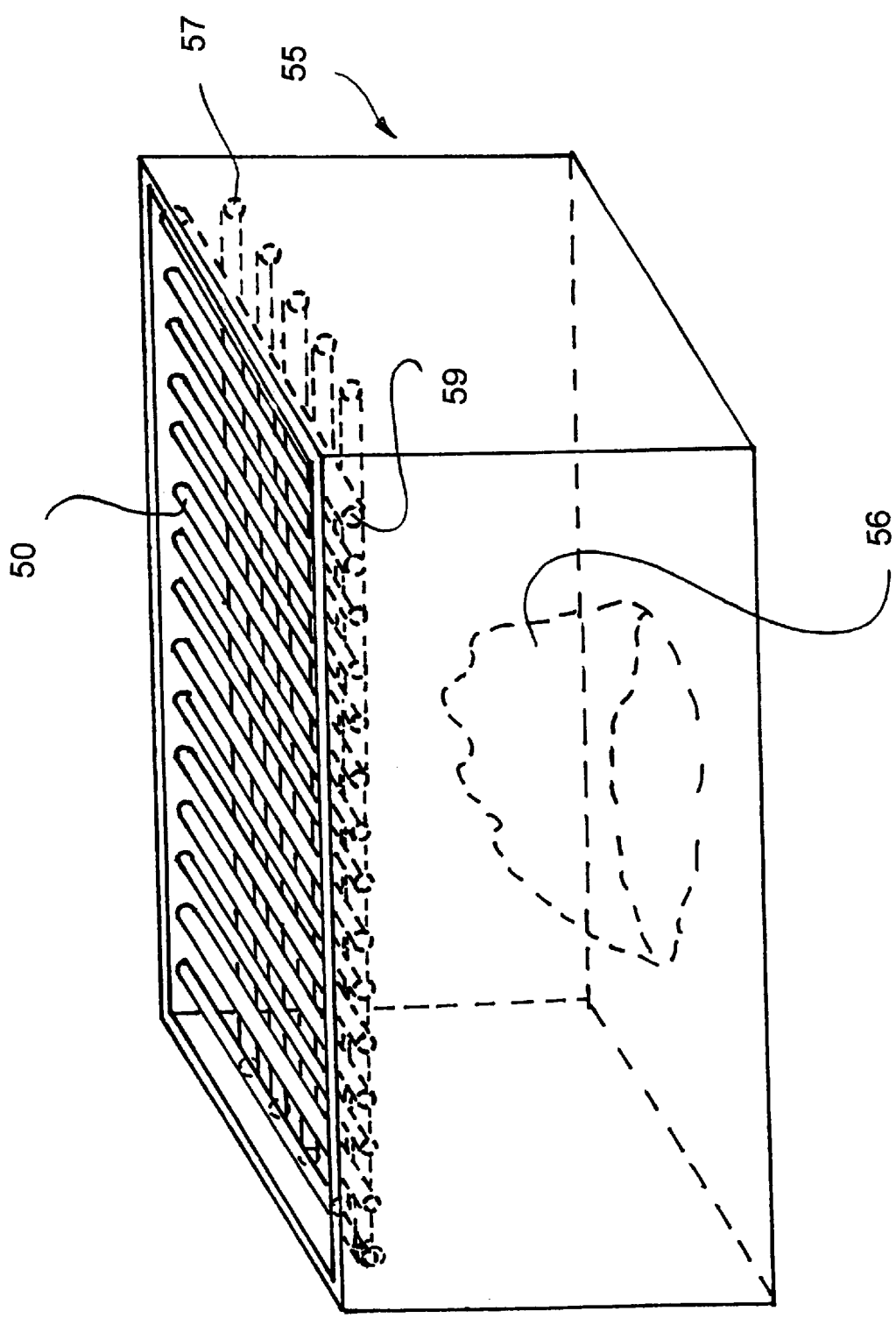
FIG. 2 is a perspective view of a casting box, containing a part model, for making the die shown in FIG. 1.

Construction of the die base 32, illustrated in FIG. 2, utilizes a die casting box 55, which is conveniently made of ¾ plywood or oriented strand board. A model 56 of the part is attached to the floor of the box 55 and two or more rows of aligned holes 57 and 59 are drilled adjacent to the top edge of the box 55 for rows of rods 50. Preferably, the holes 57 and 59 extend completely through the sides of the box 55 so they can be slid into the holes 57 and 59. If quartz rods are used, it is advisable to avoid contaminating them by handling with bare hands since they are susceptible to devitrification at high temperatures if contaminated during handling. If desired, the rods 50 can be held in position by wood strips tacked over the rows of holes after the rods 50 have been inserted, and/or the holes may be plugged and sealed by an appropriate sealing compound, such as Hydro-Cal cement.

With the rods 50 inserted and secured in position, the concrete mixture is poured into the box 55 through the rods 50 fixed across the top of the box 55. Alternatively, the rods could be inserted into the holes 57 and 59 after the concrete mixture has been poured into the box up to the level of the holes 57, and then the box 55 would be filled to the top with the rest of the concrete mixture, thereby avoiding the difficulty of pouring the concrete through the array of rods 50. The preferred concrete mixture is a fumed silica/calcium-aluminate composition such as castable Thermo-Sil 220 from Ceradyne Thermo-Materials Corp. or HS2 Castable Ceramic from Pyromedia Inc. in Seattle, Wash. Casting procedures can be obtained from the manufacturer and from the aforesaid U.S. Pat. No. 5,467,626.

After the concrete mixture has set at room temperature for 12–36 hours or more, depending on its volume, the box 55 is inverted so the model 56 is on the top. The box 55 is dismantled and a crane or winch is attached to the model 56 to gradually apply upward tension on the model 56 until it breaks free from the green die 34. The casting is then covered with wet cloths and allowed to cure at room temperature (60°–80° F.) for 3–7 days, depending on its size, removing the wet cloths after 1–2 days. After initial room temperature curing, the green die is heated in a hot air dryer to 150° F. at a ramp rate of about 50° F. in 16–36 hours, depending on its size, and dried for 2–5 days or more, depending on its size, at 150° F. It is then fired at 1825° F. for 9 hours after a gradual increase of temperature in an oven over about 3 days, with periodic opening of the oven door to vent moisture from the oven. It is then allowed to cool at about 150° F./hour to room temperature. The face of the die cavity is coated with boron nitride which protects the die surface and also serves as a release coating to minimize sticking of the titanium part to the die during superplastic forming. The die lid is made in the same manner. The die is now ready to use.

Quartz rods have a flexural strength of about 10,000 psi which provides substantial stiffness to the die base 32. The maximum modulus of rupture that can be achieved in an unreinforced silica and calcium-aluminate cement composition is about 1500 psi, and that performance is degraded by temperatures in the superplastic forming range of titanium which is about 1650° F. because water in the hydraulic bond is driven off at that temperature. The improvement in the modulus of rupture of the dies reinforced with quartz rods 50 is significant. Test samples have shown a 245% increase in strength, although strength of a complex structure such as a die is often dependent on many factors, including drying, curing and firing procedures and rod placement, so it is difficult to translate strength improvement in test samples to strength improvement in the final structure such as a die. There are ceramic materials, such as alumina, that are stronger than quartz and do not suffer from its notch sensitivity and contamination sensitivity. Alumina rods are available with a flexural strength of about 56,000 psi from Coors in Golden, Colo., but the cost is significantly greater. The trade-off between increased cost and increased strength must be determined for each application.

It may be desirable to reinforce the side walls 34 and the lid 46 with reinforcing rods 50 of ceramic material such as fused oxides of silicon or aluminum (quartz or alumina). It can be determined by finite element analysis, conventional stress analysis, and/or practical experience where the structures need reinforcing and the rods can be cast into the lid and side walls as required to obtain maximum performance, using the procedures set forth above.

It is common practice to heat ceramic dies used in metal forming with electrical heater elements embedded in channels formed in the die using plastic tubing that is removed while the die is still green, or is burned out during firing. Unfortunately this convenient and efficient method of heating the die results in a decrease in the modulus of rupture of the die because the channels weaken the die by distorting and concentrating the stresses incurred during use. This invention contemplates using hollow rods (alumina or quartz) into which electrical heater elements, such as Nichrome wires, can be inserted to heat the die during use in superplastic forming of metal parts. The quartz material, in particular, is extremely resistant to thermal shock. Use of the hollow ceramic rods eliminates a source of weakness introduced by the prior art heater element channels and actually improves the modulus of rupture of the die while providing integral electrical heating capability.

The reinforcing fused silica rods 50 were selected for use in fused silica/calcium aluminate material because of the close match of coefficients of thermal expansion. However, newer castable ceramic materials with a greater modulus of rupture are becoming available, such as Mullite aggregate ceramics, available as CK-1081 from Norton Company Refractory Systems. This material has a somewhat greater shrinkage rate and coefficient of thermal expansion than that of the in fused silica/calcium aluminate material, but is compatible chemically and thermally with alumna rods.

The invention can be used to produce reinforced dies for making isostatically pressed metal or non-metal parts, such as "PEEK" composites or APC II type resins with carbon fiber in a thermal process using a low temperature superplastic aluminum driver sheet to form the metal sheet or form and consolidate the composite between the driver sheet and the form or an interposed aluminum base sheet in accordance with U.S. Pat. No. 4,644,626. The rapid and inexpensive production of ceramic forming dies for this application would reduce the cost and speed the production of parts formed with this process.

Figure 3:
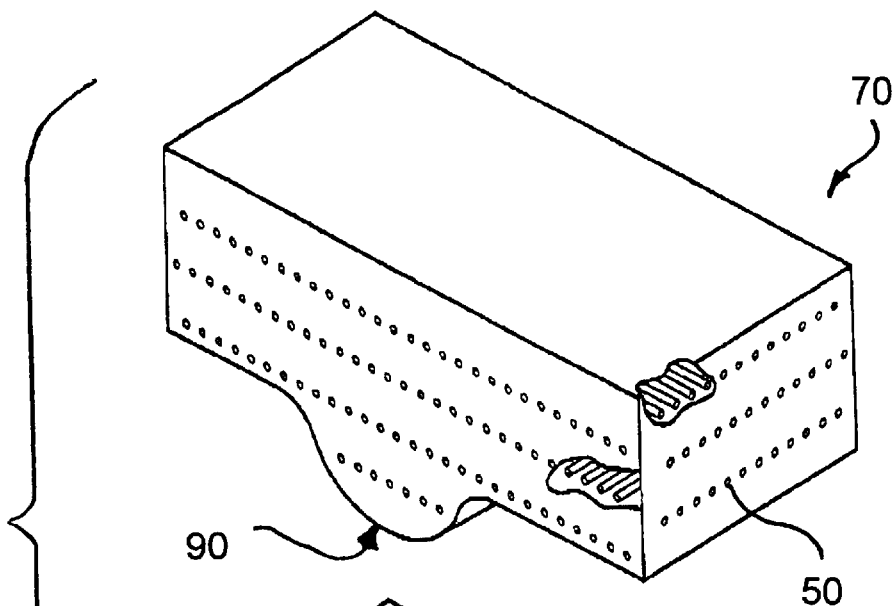
FIG. 3 is an exploded perspective view of a matched set of reinforced ceramic closed-die forging dies made in accordance with this invention.
Figure 4:
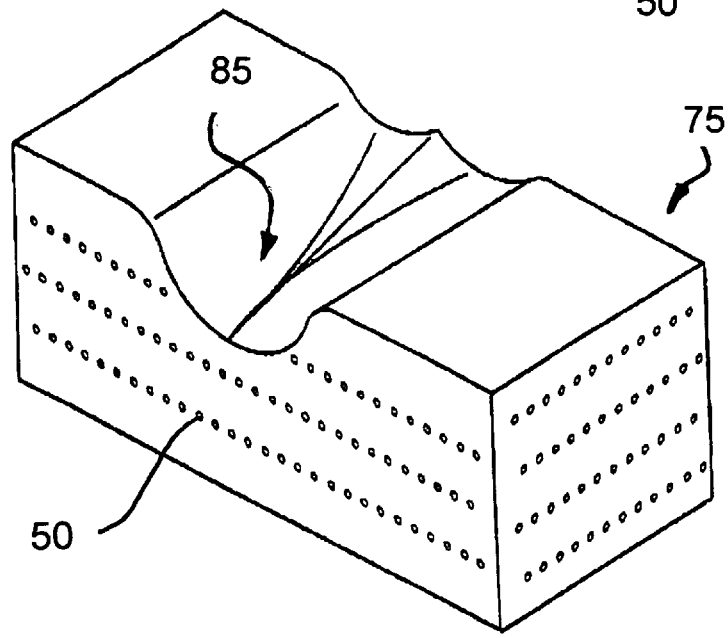
FIG. 4 is a perspective view of a part forged in the die set shown in FIG. 3.
Figure 4:
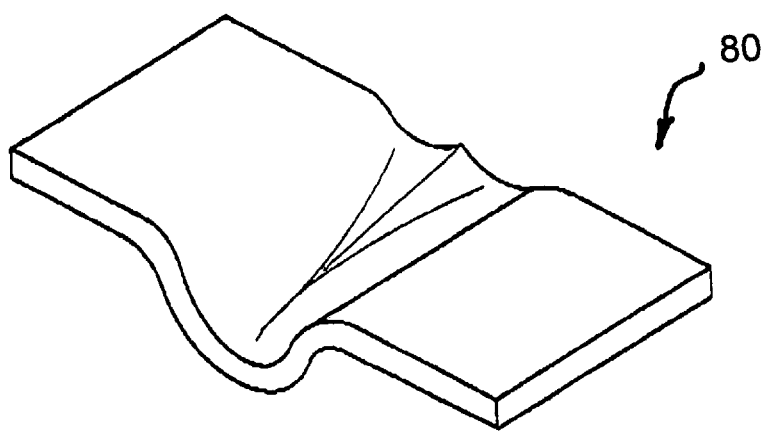

A matched set of reinforced ceramic forging dies, including an upper die 70 and a lower die 75, shown in FIG. 3 is used to make an aluminum part 80 shown in FIG. 4, using the closed-die forging process. This is a flashless process that does not require the creation of a flash around the periphery of the die to achieve complete die filling. The accuracy of the casting process makes it possible to achieve the die design and work piece volume in the die set so that complete die filling can be achieved without excessive pressure because of overfilling the work piece volume.

As shown, the lower die 75 has a die cavity 85 with a surface profile like the desired surface profile of the underside of the desired part 80, and the upper die has a corresponding male punch member 90 having a surface profile like the upper surface of the desired part 80. The forging dies are mounted in a forging press in the conventional manner and are heated to the forging temperature for the metal of which the part 80 is to be made. A metal blank is placed in the press between the two dies 70 and 75 and is allowed to reach forging temperature. Alternatively, greater throughput can be achieved by preheating the metal blank to forging temperature before placing it in the press When the blank has reached forging temperature, the press is operated to bring the dies 70 and 75 against the blank and form it to the shape defined by the surfaces of the upper and lower forming surfaces. This is an isothermal process in which forming occurs at a slow speed, so that minimal force is required and significant part complexity can be obtained.

The dies 70 and 75 are each made using the same process described above for the superplastic forming die 30, but a greater number of reinforcing rods 50 are used to strengthen the structure. The part 80 made on the dies set 70/75 is significantly stronger than a corresponding part made by conventional machining would be because the grain flow in the part 80 is oriented to follow the contour of the part 80, so the greatest strength is provided in the direction of the greatest stress that the part experiences in use.

Figure 5:
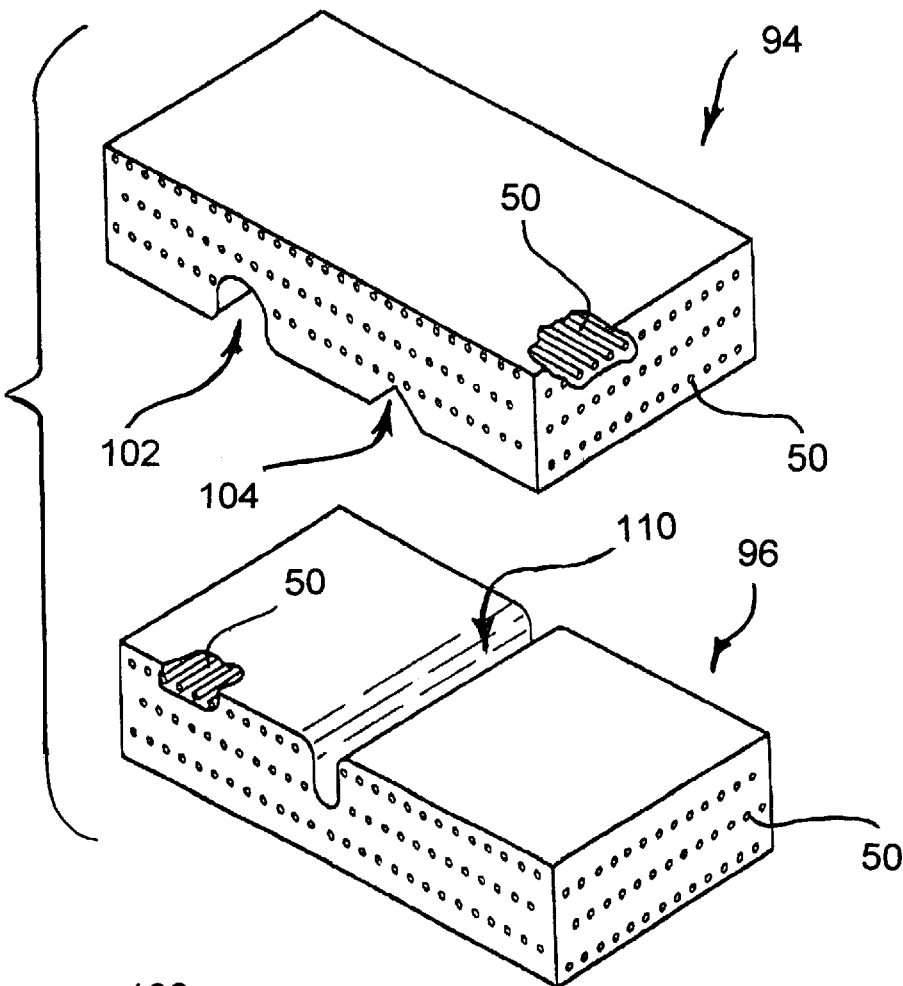
FIG. 5 is an exploded perspective view of a matched set of reinforced ceramic impression forging dies made in accordance with this invention.
Figure 6:
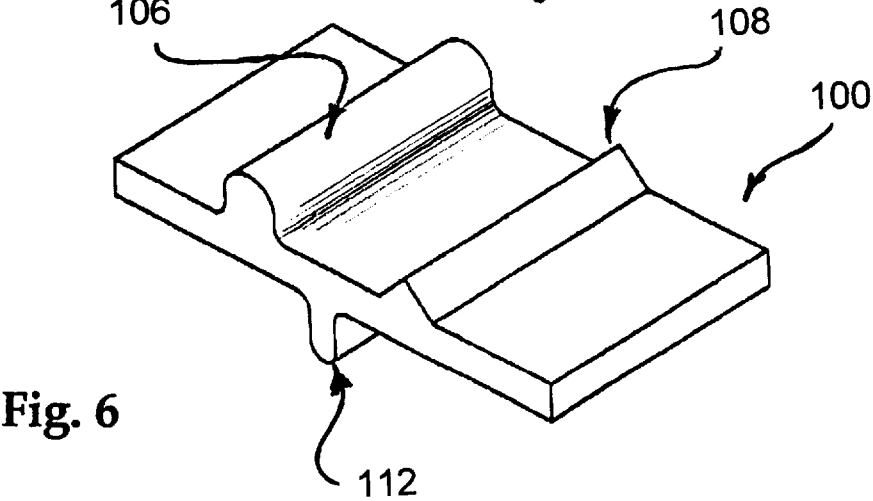
FIG. 6 is a perspective view of a part forged in the die set shown in FIG. 5.

Another set of forging dies made in accordance with this invention, shown in FIG. 5, includes an upper die 94 and a lower die 96 for making a part 100 shown in FIG. 6. The upper die 94 has cavities 102 and 104 for producing complementary shapes 106 and 108 on the top surface of the part 100. The lower die 96 has a cavity 110 for producing the complementary shape 112 on the underside of the part 100. The forging process used with the die set 94/96 produces flow of the metal blank material into the cavities 102, 104 and 110 by extrusion.

The dies 94 and 96 are made using the same process as the process used to make the superplastic forming die 30 and the forging dies 70 and 75. Reinforcing rods 50 are placed in the mold orthogonally oriented in rows as shown in FIG. 5. A preheated metal blank is inserted in the press between the dies 94 and 96 and the dies are moved toward each other against the metal blank. The hot metal in the blank flows slowly under pressure exerted by the faces of the dies 94 and 96 to fill the cavities 102, 104 and 110 and the space between the die faces to produce the part 100. The improved strength that the reinforcing rods 50 provide to the dies 94 and 96 enable them to survive the flexural and bursting loads that forging dies experience in use and also to resist chipping and cracking in use for improved durability, so that they can produce a greater number of parts at a lower total cost.

Obviously, numerous modifications and variations of this preferred embodiment will occur to those skilled in the art in light of this disclosure. Accordingly, it is expressly to be understood that these modifications and variation, and the equivalents thereof, shall be considered to be within the spirit and scope of the invention as defined in the following claims.

We claim:

1. A reinforced ceramic structure, comprising:
    a ceramic body cast from a pourable cementitious silica/calcium aluminate based ceramic material; and
    a plurality of reinforcing rods, made of monolithic fused oxides of silicon or aluminum, cast into said ceramic body, said rods having a thickness between 1/8"–2.0" and having a coefficient of thermal expansion substantially equal to the coefficient of thermal expansion of said cast ceramic body and having a flexural strength at least six times greater than that of said ceramic body.

2. A reinforced ceramic structure as defined in claim 1, wherein:
    said rods have centers that are spaced apart from each other by about 2–10 times the diameter of said rods.

3. A reinforced ceramic structure as defined in claim 1, wherein:
    said rods are bonded in said body.

4. A reinforced ceramic structure as defined in claim 1, wherein:
    said rods are disposed in an array of at least two rows with said rods in each row arranged parallel to each other and with the rods in adjacent rows arranged orthogonally to each other.

5. A reinforced ceramic structure as defined in claim 4, wherein:
    said rows are spaced apart a distance equal to about 1/2–3 times the diameter of said rods.

6. A reinforced ceramic structure as defined in claim 1, wherein:
    at least some of said rods are hollow and receive electrical heater elements for heating said reinforced ceramic structure.

7. A reinforced ceramic structure as defined in claim 1, wherein:
    said rods are coated with a release agent to prevent bonding to said ceramic body.

8. A reinforced ceramic structure as defined in claim 1, wherein:
    said rods extend completely across the full length and width of said body.

9. A process for manufacturing a reinforced ceramic die for forming a metal part, comprising:
    selecting a casting box having internal dimensions equal to desired external dimensions of said ceramic die and having a floor and an open top;
    attaching a model of said metal part to said floor of said casting box;
    boring aligned pairs of holes in inside surfaces of said casting box;
    mounting a reinforcing rod in each of said pairs of holes, said rod made of monolithic used oxides of silicon or aluminum;
    filing said casting box with a pourable cementitious material to said open top;
    allowing said pourable cementitious material to set and cure into a green die in said casting box;
    removing said green die from said casting box;
    inverting said green die and removing said model;
    drying said green die and firing said green die to produce a refractory ceramic die.

10. A process for manufacturing a reinforced ceramic die for forming a metal part as defined in claim 9, further comprising:
    smoothing said pourable cementitious material flush with said open top to produce a smooth, flat surface that will be a bottom die surface after said die is inverted.

11. A process for manufacturing a reinforced ceramic die for forming a metal part as defined in claim 10, wherein:
    said rods are about 1/8"–2" in diameter and arranged in a row parallel to said bottom surface.

12. A process for manufacturing a reinforced ceramic die for forming a metal part as defined in claim 11, wherein:
    said rods are parallel to each other and are spaced apart on centers a distance equal to about 1½–5 times said rod diameter.

13. A process for manufacturing a reinforced ceramic die for forming a metal part as defined in claim 11, wherein:
    said rods are arranged in at least two rows parallel to said bottom surface, one of said rows having rods that are all parallel to each other and the other of said rows having rods that are all parallel to each other and orthogonal to said rods in said one row.

14. A reinforced ceramic die for forming a metal part, comprising:
    a free-standing ceramic body cast from a pourable cementitious ceramic material having a die cavity defined by internal surfaces of a peripheral wall and a die floor integral with said peripheral wall, said floor having a bottom surface on which said die rests;
    a peripheral lip around an upper edge of said peripheral wall, said lip having a top configuration that cooperates with corresponding peripheral surfaces on an underside of a die lid to seal said die cavity;
    a plurality of rods embedded in said floor, said rods having a coefficient of thermal expansion substantially equal to the coefficient of thermal expansion of said cast ceramic body and having a flexural strength at least six times greater than that of said ceramic body.

15. A forming die as defined in claim 14, further comprising:

a plurality of said rods embedded in said peripheral wall.

16. A forming die as defined in claim 14, wherein:

said rods are made of fused oxides of silicon or aluminum.

17. A forming die as defined in claim 14, wherein:

at least some of said rods have bores containing electrical heater elements for heating said die.

18. A forming die as defined in claim 14, wherein:

said rods are disposed in at least two rows parallel to said bottom surface, each of said rods in each row lying parallel to each other and perpendicular to the rods in the other row.

19. A reinforced ceramic structure, comprising:

a body of cast ceramic material having a coefficient of thermal expansion; and a plurality of reinforcing rods, made of ceramic materials selected from the class consisting of monolithic fused oxides of silicon and aluminum, cast into said ceramic body;

said ceramic material having a coefficient of thermal expansion substantially equal to said coefficient of thermal expansion of said body of cast ceramic material and having a modulus of rupture at least 5 times greater than the modulus of rupture of said cast ceramic material.

\* \* \* \* \*